(12) United States Patent
Morel et al.

(10) Patent No.: US 9,703,294 B2
(45) Date of Patent: Jul. 11, 2017

(54) ADVANCED CONTROL RELATIONSHIP FOR A DEFLECTABLE STABILIZER

(71) Applicant: AIRBUS HELICOPTERS, Marignane (FR)

(72) Inventors: Herve Morel, Lamanon (FR); Nicolas Queiras, Les Pennes Mirabeau (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 15/146,081

(22) Filed: May 4, 2016

(65) Prior Publication Data
US 2016/0327957 A1    Nov. 10, 2016

(30) Foreign Application Priority Data

May 5, 2015 (FR) ..................... 15 00935

(51) Int. Cl.
| | |
|---|---|
| *G05D 1/08* | (2006.01) |
| *B64C 13/16* | (2006.01) |
| *B64C 27/82* | (2006.01) |

(52) U.S. Cl.
CPC ........... *G05D 1/0816* (2013.01); *B64C 13/16* (2013.01); *B64C 27/82* (2013.01); *G05D 1/0858* (2013.01); *B64C 2027/8281* (2013.01)

(58) Field of Classification Search
CPC .... G05D 1/0816; G05D 1/0858; B64C 13/16; B64C 27/82; B64C 2027/8281
See application file for complete search history.

(56) References Cited

U.S. PATENT DOCUMENTS

| 2,424,882 A | 7/1947 | Gluhareff |
| 3,717,317 A | 2/1973 | Certain |
| 4,103,848 A | 8/1978 | Johnson, Jr. et al. |

(Continued)

FOREIGN PATENT DOCUMENTS

| EP | 0183282 | 6/1986 |
| EP | 0743582 | 11/1996 |

(Continued)

OTHER PUBLICATIONS

French Search Report for French Application No. FR 1500935, Completed by the French Patent Office on Mar. 18, 2016, 12 Pages.

(Continued)

*Primary Examiner* — Todd Melton
(74) *Attorney, Agent, or Firm* — Brooks Kushman P.C.

(57) ABSTRACT

A method of controlling a deflection angle of pitching stabilizer means for an aircraft. The method includes a preliminary stage for preparing at least one control relationship delivering a setpoint angle that is to be reached by the deflection angle as a function of at least one flight parameter of the aircraft and of an incidence parameter of the pitching stabilizer means. During an operational stage an operational stage (STP2), a "flight" value is determined for each of the flight parameters, a "setpoint" value is determined for the incidence parameter, a setpoint angle is determined by inputting the flight values and setpoint value into the control relationship, and at least one actuator is actuated in order to cause the deflection angle of the pitching stabilizer means to reach the setpoint angle.

13 Claims, 4 Drawing Sheets

(56) References Cited

U.S. PATENT DOCUMENTS

| | | | |
|---|---|---|---|
| 4,304,375 A | 12/1981 | Builta et al. | |
| 4,676,460 A * | 6/1987 | Hagy | G05D 1/0607 244/178 |
| 5,571,953 A * | 11/1996 | Wu | G05D 1/0607 701/124 |
| 6,123,291 A * | 9/2000 | Dequin | B64C 13/16 244/17.13 |
| 6,830,214 B2 * | 12/2004 | Carson | B64C 27/605 244/17.11 |
| 7,451,949 B2 | 11/2008 | Eglin | |
| 8,052,094 B2 | 11/2011 | Roesch | |
| 8,985,500 B2 | 3/2015 | Borie et al. | |

FOREIGN PATENT DOCUMENTS

| | | |
|---|---|---|
| EP | 0743582 | 4/1998 |
| EP | 1547920 | 6/2005 |
| FR | 2067224 | 8/1971 |
| FR | 2383475 | 10/1978 |
| FR | 2456663 | 12/1980 |
| FR | 2771706 | 6/1999 |
| FR | 2962972 | 1/2012 |
| GB | 657796 | 9/1951 |
| WO | 2004007282 | 1/2004 |
| WO | 2008142256 | 11/2008 |
| WO | 2015152910 | 10/2015 |

OTHER PUBLICATIONS

Lefort et al. L'Helicoptere Theorie et practique, 3rd Edition, 3 Pages, "Reglementation et calculs".

Federal Aviation Regulations Part 29, 14 C.F.R. Ch.1, 1-1-10 Edition, Federal Aviation Administration, DOT, pp. 718-836, "Part 29 Airworthiness Standards, Transport Category Rotorcraft".

* cited by examiner

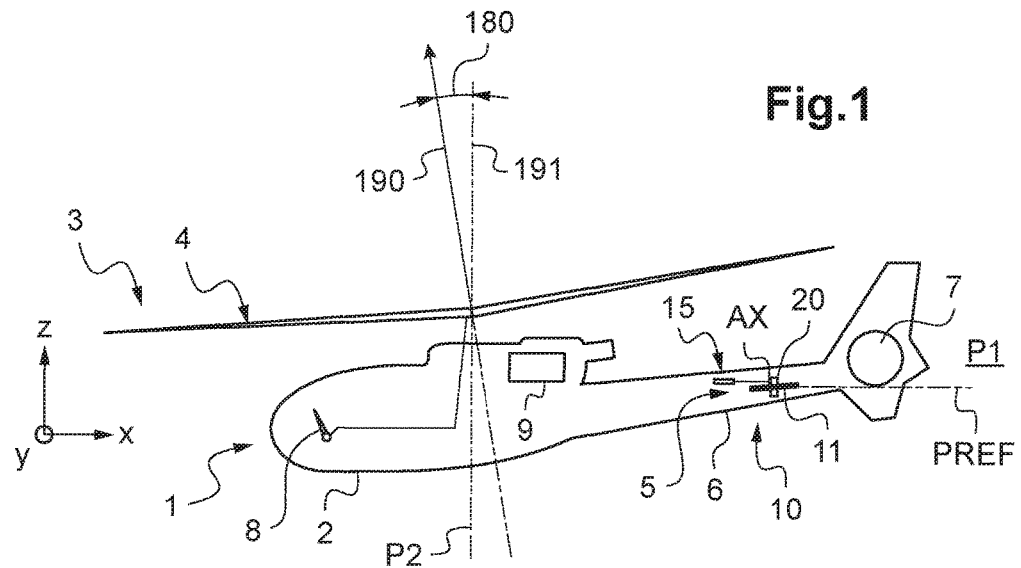
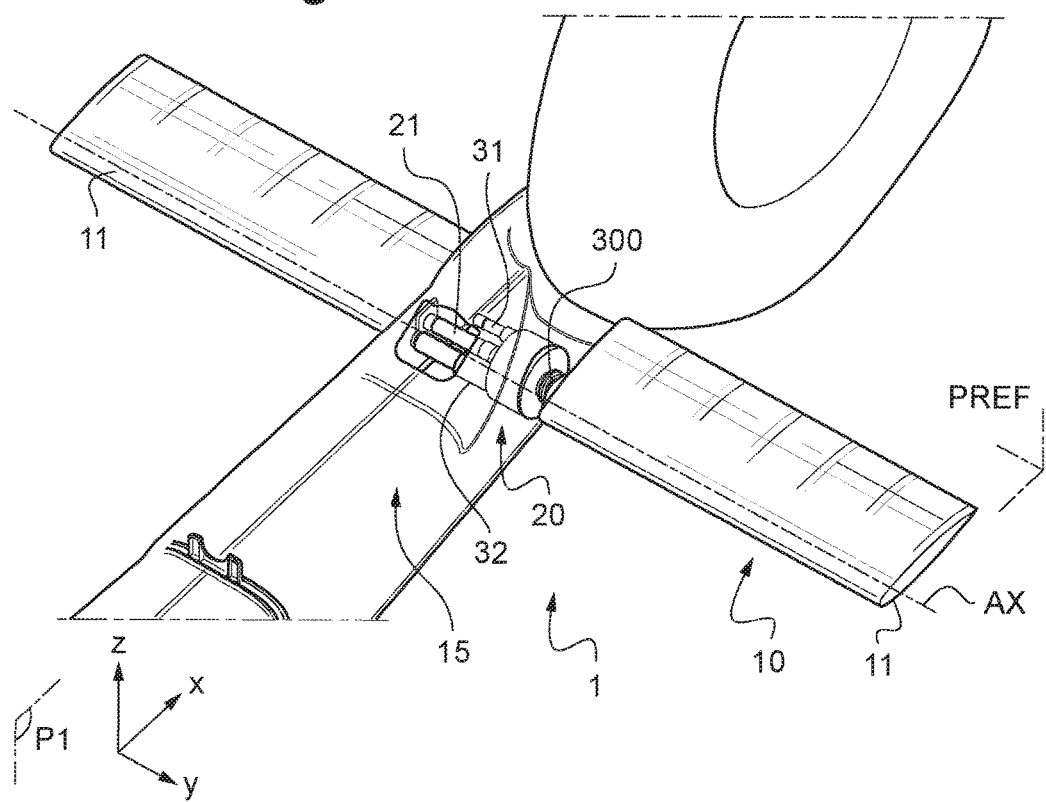

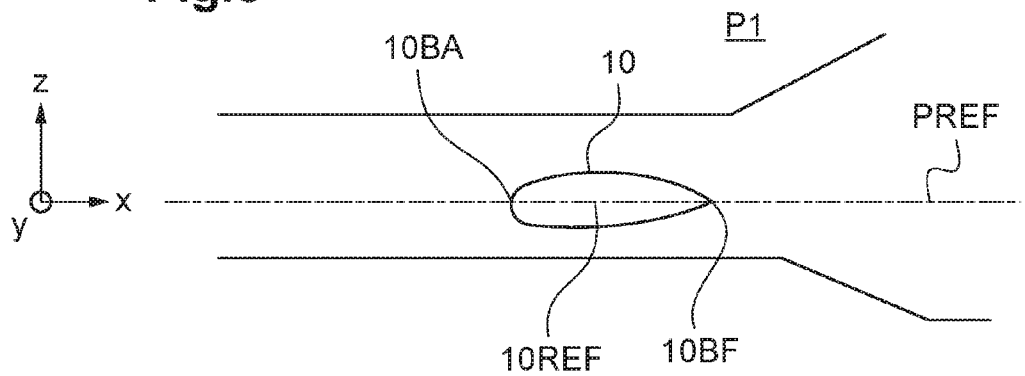
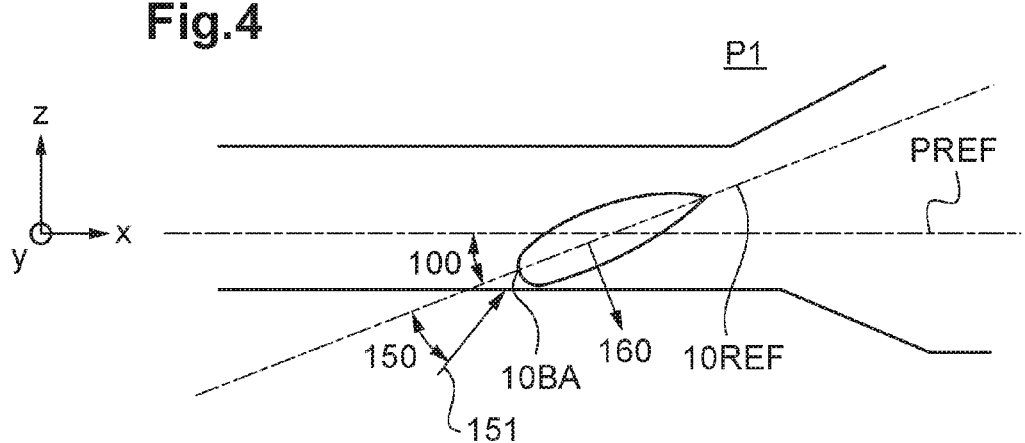
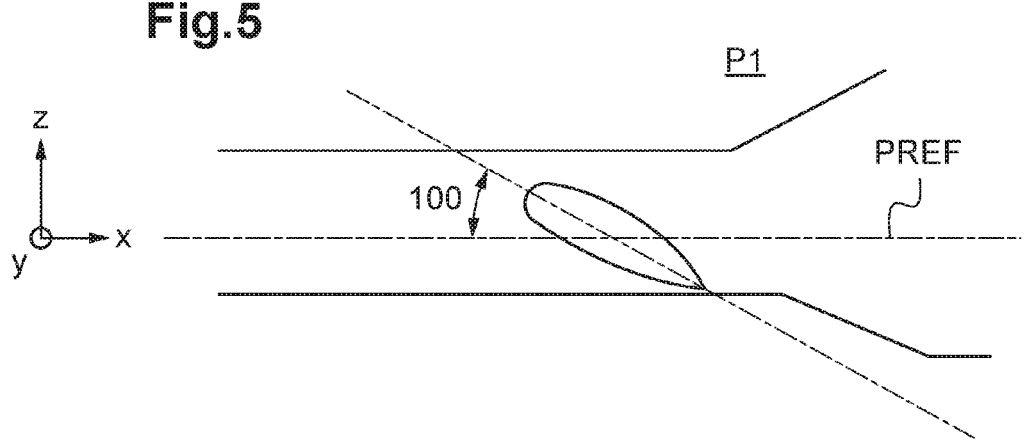

ADVANCED CONTROL RELATIONSHIP FOR A DEFLECTABLE STABILIZER

CROSS REFERENCE TO RELATED APPLICATION

This application claims priority to French patent application No. FR 15 00935 filed on May 5, 2015, the disclosure of which is incorporated in its entirety by reference herein.

BACKGROUND OF THE INVENTION (1) Field of the Invention

The present invention relates to a method of controlling movable pitching stabilizer means, and to a stabilizer system and to an aircraft applying the method. More particularly, the invention lies in the narrow technical field of means for stabilizing rotorcraft in pitching.

(2) Description of Related Art

Conventionally, a rotorcraft comprises, by way of example, a fuselage extending longitudinally from a front end to a rear end on either side of an anteroposterior plane of symmetry, and in a vertical direction from a bottom portion having landing gear to a top portion having a rotary wing. The rotary wing may include at least one main rotor for providing lift and possibly also propulsion.

Furthermore, the rotorcraft may have a tail rotor at its rear end. The tail rotor serves in particular to control yaw movements of the rotorcraft.

Furthermore, a rotorcraft sometimes has additional stabilizer surfaces. For example, a rotorcraft is usually fitted with a surface for stabilizing yaw movements.

Such a surface for stabilizing yaw movements is generally referred to as a "fin".

Likewise, a rotorcraft sometimes has means for balancing and stabilizing pitching movements, referred to more simply as "stabilizer" means. Stabilizer means present an angle of absolute value lying in the range 0° to substantially 90° relative to said anteroposterior plane. The pitching stabilizer means may possibly comprise two pitching stabilizer surfaces extending symmetrically on either side of an anteroposterior plane of symmetry of the rotorcraft, being orthogonal to said anteroposterior plane, or indeed presenting a V-shape, for example.

Such means for stabilizing pitching movements are sometimes referred to as a "horizontal stabilizer" or more simply below as a "stabilizer". The term "stabilizer" is used more particularly since the stabilizer means are not necessarily horizontal. The term "pitching stabilizer means" is also used.

A stabilizer may comprise at least one airfoil surface passing through the rear end of the aircraft in a transverse direction, or at least one non-through airfoil surface extending transversely from said rear end on one side only of said anteroposterior plane.

In hovering flight, balancing the pitching moment of the rotorcraft about a fixed point involves two main components: a first component due to the weight and the position of the center of gravity of the rotorcraft, and a second component due to the aerodynamic forces resulting from the main lift rotor. For a given weight of the rotorcraft, the second component is proportional to the angle of tilt of the main rotor relative to a vertical direction. Furthermore, variations in the position of the center of gravity of the rotorcraft give rise to variations in the attitude of the rotorcraft.

While the rotorcraft is in cruising flight, a third component of the pitching moment becomes involved: the aerodynamic moment that is exerted on the fuselage of the rotorcraft as a result of variations in the angle of incidence of the fuselage relative to the upstream air flow. The aerodynamic pitching moment tends to move the aircraft away from its equilibrium position. This third component, which is unstable, has the consequence of increasing variations in the longitudinal attitude that are associated with the position of the center of gravity relative to the variations that are observed during hovering flight.

These variations in attitude have negative consequences. Considerable nose-down attitudes increase the aerodynamic drag of the rotorcraft and consequently reduce its maximum speed. Such nose-down attitudes also lead to a feeling of discomfort for the crew and passengers. Considerable nose-up attitudes give rise to large moments on the drive mast of the main rotor and on the hub of the main rotor, with consequences that are unfavorable for the lifetimes of those elements. At lower speeds of advance and during stages of landing, large nose-up attitudes also give rise to a reduction in the pilot's visibility and thus to an increase in the pilot's workload.

The pitching stabilizer means placed towards the rear of a rotorcraft seek in particular to compensate for the instability of the pitching moment of the fuselage and to balance the attitude of the rotorcraft. It is difficult to dimension pitching stabilizer means.

In order to optimize the performance of an aircraft at high speed, the pitching stabilizer means are dimensioned so as to obtain a longitudinal attitude that is close to a zero attitude. Such a dimensioning is nevertheless penalizing on the operation of the main rotor, given that a considerable nose-down attitude is desirable for the operation of the main rotor when the forward speed of the rotorcraft is high.

Furthermore, the dimensioning needs to be satisfactory for the various potential configurations of the weight, the attitude, the position of the center of gravity of the aircraft, and possibly also various possible external aerodynamic configurations of the aircraft.

Optionally, the effectiveness of the pitching stabilizer means can be maximized by increasing the wing area so as to reduce the effects of disturbances associated with variations in the weight and the positioning of the center of gravity of the rotorcraft.

Nevertheless, such a solution is limited, e.g. because of the "attitude hump" phenomenon that is known to the person skilled in the art and that results from interactions between the main rotor and the pitching stabilizer means. Furthermore, a large wing area tends in particular to lead to large variations in the attitude of the aircraft during stages of flight in which the stream of air coming from the main rotor impacts against the pitching stabilizer means, e.g. while the aircraft is climbing or descending.

Manufacturers have sought to remedy those drawbacks by creating a device referred to for convenience as a "positioner" device. The function of such a positioner device is to adjust the angular position of pitching stabilizer means so as to balance the rotorcraft in pitching, while simultaneously controlling its performance and the loads applied to the hub of a main rotor, while being unaffected by variations in the position of the center of gravity and while satisfying the above-mentioned constraints that require the size of said aerodynamic surface to be limited.

Thus, the pitching stabilizer means are movable in pivoting about a pivot axis. As a result, the positioner device enables a deflection angle of the stabilizer means to be adjusted. Such a deflection angle represents an angle between a reference chord of the pitching stabilizer means and a reference plane of the aircraft, e.g. a horizontal reference plane.

Thus, Documents U.S. Pat. No. 2,424,882 and GB 657 796 provide a positioner device comprising a lever that is mechanically connected to pitching stabilizer means in order to control the position of the stabilizer means.

Those documents suggest manual piloting of the pitching stabilizer means. The way the pitching stabilizer means are controlled then represents a compromise that is implemented directly by the pilot of the aircraft.

Likewise, Document WO 2004/007282 A2 describes means for controlling a deflectable stabilizer independently of a main cyclic control of a helicopter. Those control means comprise a control that can be moved by a pilot.

Given the increasing technical complexity of rotorcraft and of piloting them, pitching stabilizer means are controlled while taking account of various factors, rather than merely on the basis of an action by the pilot.

Document FR 2 456 663 provides for using a positioner device to servo-control the position of pitching stabilizer means as a function of flight conditions.

That positioner device comprises an electric motor for servo-controlling the control of the pitching stabilizer means. Furthermore, a sensor sensing the longitudinal cyclic control, a sensor sensing the collective pitch position of the blades of the main rotor, and a sensor for sensing speed relative to air issue signals that are combined in order to provide a sum signal. The sum signal is modified by a factor that varies inversely with the speed of the aircraft relative to air, and it is then transmitted to a servo-control device for controlling the pitching stabilizer means.

In order to operate pitching stabilizer means, certain positioner devices make use not of one electric actuator, but rather of two that are mounted back to back. One actuator is fastened to the tail boom of said aircraft, and another actuator is fastened to pitching stabilizer means.

Document EP 1 547 920 A1 describes a tiltable stabilizer seeking to reduce the vibration that is generated on the structure of a helicopter by the aerodynamic flow of air coming from the main rotor. That document makes use of a positioner device having at least one vibration sensor.

Document WO 2008/142256 suggests adjusting the pitching moment of a fuselage from at least one movable pitching control surface forming part of the horizontal stabilizer of an aircraft. A one-to-one relationship may be established between the position of the stabilizer and the value of the moment exerted on a rotor mast. The value of this moment can thus be controlled at all times firstly with an objective of reducing fatigue on the mechanical part and secondly with an objective of sharing power between the propellers and a rotor of the aircraft.

Document FR 2 383 475 describes a helicopter having pitching stabilizer means and a positioner device for modifying the position of the pitching stabilizer means.

Under such circumstances, the aircraft has generator means for transmitting a control signal to the positioner device. The control signal is generated as a function of an aerodynamic speed, of a collective pitch percentage of the blades of a rotor, of lateral accelerations of the helicopter, of a pitching rate of the about a pitching axis, and of a constant produced by a bias circuit.

Document FR 2 067 224 describes a mechanical positioner device actuated by inertia and suitable for causing a stabilizer to pivot.

Document FR 2 962 972 is remote from the problem of the invention since it presents stationary biplane stabilizer means.

Documents FR 2 771 706, WO 2015/152910, EP 0 183 282, and EP 0 743 582 are also known.

BRIEF SUMMARY OF THE INVENTION

An object of the present invention is thus to propose an innovative method for controlling a deflection angle of pitching stabilizer means.

The invention thus provides a method of controlling a deflection angle of movable pitching stabilizer means of an aircraft. The method comprises:

a preliminary stage comprising a preparation step of preparing at least one control relationship providing a setpoint angle that said deflection angle is to reach as a function firstly of at least one flight parameter of the aircraft and secondly of an incidence parameter of the pitching stabilizer means; and an operational stage during which the following steps are performed:
  determining a "flight" value for each of the flight parameters;
  determining a "setpoint" value for the incidence parameter;
  determining a setpoint angle by inputting the flight values and setpoint value into the control relationship; and
  activating at least one actuator to cause the deflection angle of the pitching stabilizer means to reach said setpoint angle.

The control relationship may have multiple forms. Thus, the control relationship may be in the form of a mathematical relationship providing the setpoint angle as a function of the flight parameters and of the setpoint.

This control relationship may be also be in the form of an algorithm, a table of values, or indeed a sequence of operations performed by a logic circuit, for example.

The term "control relationship" thus covers one or more physical, logical, or mathematical relationships enabling a deflection angle to be delivered on the basis of at least one flight parameter and an incidence parameter.

Each flight parameter is a parameter that represented at least in part the position or the movement of the aircraft in three-dimensional space, or indeed the operation of certain members of the aircraft.

In addition, the deflection angle represents the angle formed between a reference chord of a reference profile of the airfoil surface and a reference plane. The deflection angle is zero when the reference chord is contained in the reference plane.

Furthermore, the incidence parameter is representative of the angle of incidence of the pitching stabilizer means. It should be recalled that the angle of incidence of an airfoil surface is the angle formed between a reference chord of a profile of the airfoil surface and the speed vector of the relative wind striking the airfoil surface. The angle of incidence of the pitching stabilizer means is then equal to the deflection angle of the pitching stabilizer means only when the relative wind speed vector is present in the reference plane of the pitching stabilizer means.

Under such circumstances, and during a preliminary stage, a manufacturer draws up the control relationship, e.g. on the basis of simulations and/or tests. The control relationship enables the deflection angle of pitching stabilizer means to be controlled on the basis of the behavior of the aircraft as observed through flight parameters, and on the basis of the angle of incidence desired for the pitching stabilizer means as represented by the incidence parameter.

Using the incidence parameter as input to the control relationship is innovative since such an angle of incidence is difficult to evaluate. Measuring the deflection angle of the pitching stabilizer means is easy. However, measuring the angle of incidence of the pitching stabilizer means is difficult since such a measurement requires the relative wind speed vector to be determined at the leading edge of the pitching stabilizer means.

The angle of incidence of pitching stabilizer means in flight is particularly difficult to estimate without direct measurement. Numerous complex aerodynamic phenomena take place on a rotorcraft, in particular at low speed (rotor/stabilizer interaction, ground effect), and also at high speed (fuselage/stabilizer interaction). Furthermore, using dedicated instrumentation for measuring an angle of incidence in order to control the pitching stabilizer means is disadvantageous in terms of weight and of cost for a production aircraft. The invention has the advantage of making it possible to prepare the control of the pitching stabilizer means through an incidence setpoint without permanently making use of instrumentation dedicated for measuring the angle of incidence.

During the operational stage, the flight value of each flight parameter is determined, e.g. using conventional measurements.

Furthermore, the setpoint value is determined for the incidence parameter. Nevertheless, this setpoint value is not the result of a direct measurement of an angle of incidence. The setpoint value may for example be set by a person, or by a predetermined incidence relationship setting the setpoint value as a function of the stage of flight.

In addition, each flight value and the setpoint value are used for determining a setpoint angle by applying the control relationship. The control relationship does not act on the flight values of the flight parameters or on the setpoint value, but it makes use of those values for determining the deflection angle to be achieved. Thus, the control relationship does not provide an angle of incidence to be complied with as such, but it provides a deflection angle on the basis of a setpoint incidence by using the setpoint value.

Under such circumstances, the pitching stabilizer means are operated to reach the required setpoint angle, e.g. by using an open loop regulation relationship. By way of example, an angle sensor may be used both to verify the proper positioning of the pitching stabilizer means and also for tracking purposes.

As a result, this method does indeed make it possible to reach a setpoint incidence, without requiring the angle of incidence to be measured during an operational stage.

This method thus uses a closed servo-control loop since the current deflection angle of the pitching stabilizer means can be measured and compared with the setpoint angle. Such a closed servo-control loop would nevertheless appear to be impossible to obtain for a relationship that is based on a setpoint incidence parameter that is to be reached, given the instrumentation that would be needed in order to measure such an angle of incidence.

Furthermore, certain prior art techniques are sometimes limited to improving one particular stage of the flight envelope, e.g. for the purpose of tending to minimize the attitude-hump phenomenon. Conversely, the control relationship of the invention makes it possible continuously to adjust the deflection angle of the pitching stabilizer means throughout the flight envelope on the basis of the current flight conditions of the aircraft and on the basis of a setpoint value for an incidence parameter.

When applying the control relationship, the setpoint value of the incidence parameter can be adjusted as a function of the desired behavior for the pitching stabilizer means. For example, a positive angle of incidence makes it possible to obtain pitching stabilizer means generating a nose-down moment on the aircraft, a negative angle of incidence makes it possible to obtain pitching stabilizer means that dump lift and generate a nose-up moment on the aircraft. A zero angle of incidence makes it possible to obtain a stabilizer that has no effect on the balance of the machine.

By thus imposing a setpoint on an incidence parameter for the pitching stabilizer means, the resulting control relationship enables the stabilizer to be controlled throughout the flight envelope. As a function of the imposed setpoint value, the deflection angle of the pitching stabilizer means varies so that the pitching stabilizer means reach the desired angle of incidence. This variation in the deflection angle of the pitching stabilizer means thus leads to the aircraft having the desired behavior.

For example, a zero angle of incidence can be imposed during hovering flight in order to ensure that the pitching stabilizer means have no effect relative to an incident air stream. Conversely, a negative incidence setpoint can be used during a descending or climbing stage of flight in order to maintain a lift dumping effect on the pitching stabilizer means.

For example, during a descent, the angle of incidence seen by the stationary pitching stabilizer means increases for a given setting, e.g. passing from $-10°$ to $-5°$ as a result of the behavior of the aircraft. This increase in the angle of incidence leads to a reduction in the lift dumping effect of the pitching stabilizer means and thus to an increase in the nose-down pitching attitude while descending.

Conversely, the invention makes it possible to set a fixed value for the incidence setpoint. This setpoint value leads to a modification to the deflection angle of the pitching stabilizer means during the descent and thus makes it possible to keep the lift dumping effect of the pitching stabilizer means constant throughout the descent in order to stabilize the attitude of the aircraft.

This feature can advantageously be used for improving the stability of the aircraft, for reducing the power consumed by the power plant, or indeed for reducing the loads exerted on a rotor during dynamic maneuvers.

The method may also include one or more of the following characteristics.

Thus, the incidence parameter may be either an aerodynamic angle of incidence of the pitching stabilizer means as such, or a lift force exerted on said pitching stabilizer means, or a twisting moment measured on a shaft supporting the pitching stabilizer means.

The angle of incidence of an airfoil surface determines the lift generated by that airfoil surface. As a corollary, the lift from an airfoil surface results directly from the angle of incidence of that airfoil surface.

Under such circumstances, in a first variant, the incidence parameter is the aerodynamic angle of incidence of the pitching stabilizer means.

During the preliminary stage, angle of incidence measurements may be performed using conventional instrumentation, such as a vane.

In contrast, in a second variant, the incidence parameter is the lift force exerted on the pitching stabilizer means. The control relationship then depends not on an angle of incidence but on a lift force on the pitching stabilizer means.

During the preliminary stage, instrumentation making use of strain gauges can be used to evaluate this lift force.

In a third variant, the incidence parameter is a twisting moment measured on a shaft supporting the pitching stabilizer means.

Furthermore, said pitching stabilizer means may comprise two stabilizer airfoil surfaces arranged laterally on either side of a structure, such as a tail boom.

The two stabilizer airfoil surfaces may be controlled identically.

Nevertheless, a control relationship may be established for each stabilizer airfoil surface, with the respective deflection angles of the two stabilizer airfoil surfaces being independent of each other.

This implementation seeks to take account of any asymmetry in the angles of incidence of the stabilizer airfoil surfaces.

Furthermore, and by way of example, each flight parameter is selected from a list comprising at least one of the following elements:

a longitudinal position parameter representing a position of a longitudinal pilot control controlling a longitudinal angle between a lift vector of the aircraft and gravity in a longitudinal plane of the aircraft;

a lateral position parameter representing a position of a lateral pilot control controlling a lateral angle between said lift vector of the aircraft and gravity in a lateral plane of the aircraft;

a pitching attitude of the aircraft;

a roll attitude of the aircraft;

an air speed of the aircraft;

a vertical speed of the aircraft in the gravity direction; and a power being consumed by a power plant of the aircraft.

Furthermore, an aircraft usually has a "cyclic" stick that is used for controlling the cyclic pitch of the blades of a lift rotor. The longitudinal position parameter may be measured by way of example by using an angle sensor measuring pivoting of the cyclic stick in the longitudinal plane about a first axis. Likewise, the lateral position parameter may be measured, for example, using an angle sensor measuring pivoting of the cyclic stick in a lateral plane about a second axis.

The longitudinal position parameter and/or the lateral position parameter may be measured downstream from such a cyclic stick. Specifically, the rotorcraft may have actuators arranged in parallel or in series on control lines connecting a pilot control to a rotor. A conventional sensor can measure the position of a reference point in a control line downstream from said actuators in order to determine the longitudinal position parameter, and/or another sensor can measure the position of a reference point of a control line downstream from said actuators in order to determine the lateral position parameter.

In an embodiment, said preliminary stage comprises:

a measurement step during which data is acquired at measurement points associating the values of the flight parameters and said incidence parameter together with the deflection angle of the pitching stabilizer means, each measurement point being obtained by positioning said pitching stabilizer means at a given deflection angle and by measuring in flight the values of the flight parameters and of said incidence parameter; and said preparation step during which said control relationship is set up on the basis of said data.

The control relationship is thus established by performing at least one test flight on a test aircraft. In particular, the test aircraft is provided with instruments in order to be able to measure the incidence parameter. These instruments are not used during the operational stage.

For example, and in the first variant of the invention, the angle of incidence of the pitching stabilizer means is measured by dedicated means, a vane or other means, placed at the leading edge of the pitching stabilizer means. Such dedicated means are present on the aircraft only during this measurement step since they are of no use subsequently. The method of the invention does not require the incidence parameters to be measured during the operational stage, thereby advantageously making it possible to avoid adding additional instrumentation on a production aircraft.

The measurement step then consists in recording in flight the values of the flight parameters and of the incidence parameter for a variety of typical maneuvers (climbing, descending, level flight, turning) over the entire flight envelope and for multiple deflection angles of the pitching stabilizer means. Flight data can be recorded using means that are well known in aviation.

The multiple stages of flight and the multiple deflection angles of the pitching stabilizer means that are used make it possible to obtain a database with a large amount of data. This data then makes it possible in the long run to establish a control relationship that is robust.

The preparation step thus consists in processing the data in order to obtain a control relationship that makes it possible to obtain the deflection angle from the flight parameters and the incidence parameter.

The control relationship may be prepared in various ways, namely using a neural network, a linear regression method, a non-linear regression method of the least squares type or of the maximum likelihood type, . . . .

In particular, it is possible to use the Levenberg-Marquardt algorithm in order to prepare the control relationship.

Under such circumstances, during the operational stage, the control relationship is used by imposing a setpoint value on the incidence parameter in order to obtain a setpoint angle as a function of the current flight conditions of the aircraft as observed using the flight parameters.

Furthermore, and by way of example, in a first alternative the setpoint value may be set by a pilot.

A pilot can thus operate an instrument in order to set a setpoint value depending on the needs of the pilot.

In a second alternative, the setpoint value may be determined automatically using at least one incidence relationship supplying the setpoint value as a function of a stage of flight. The first alternative is compatible with the second alternative, it being possible for the setpoint value on an aircraft to be determined either by a pilot or else automatically.

Like the control relationship, the incidence relationship may have multiple forms. The term "incidence relationship" covers one or more physical, logical, or mathematical relationships making it possible to provide a setpoint value for an incidence parameter as a function of the current stage of flight.

For example, the incidence parameter may have at least one of the following values:

a zero value during a stage of flight being performed on the level at a speed of advance that is less than a predetermined threshold speed, and thus in particular during forward flight at low speed;

a zero value during a stage of takeoff with an aircraft belonging to category A, where category A is specified in FAR 29, i.e. part 29 of the Federal Aviation Regulations as issued by the US Federal Aviation Administration; and a positive value below an incidence threshold during an approach stage of flight for a precision landing, named "atterrissage ponctuel" in French language.

Category A is well known and identified by the person skilled in the art. By way of example, the book "L'hélicoptère, théorie et pratique" [Helicopter theory and practice] by P. Lefort and J. Hamann, 3rd edition, refers to category A on page 125.

Likewise, the term "approach stage of flight for a precision landing" designates a stage known to the person skilled in the art. Precision landing then represents landing on a zone that is not clear, i.e. a zone presenting obstacles that need to be avoided during landing.

By way of example, during a stage of flight at low speed in which the attitude-hump phenomenon can be penalizing on a rotorcraft, requiring a zero angle of incidence makes it possible to minimize interaction between the pitching stabilizer means and the stream of air coming from the lift rotor, thereby generating a slightly nose-up attitude.

For takeoff with an aircraft of category A, imposing a zero angle of incidence also makes it possible to reduce the total power consumed by the aircraft in order to optimize the available power margin.

E.g. during precision landing approach stages, imposing a slightly positive angle of incidence makes it possible to generate a nose-down moment on the aircraft by using the pitching stabilizer means in order to improve the pilot's visibility during the approach. Furthermore, this nose-down moment reduces the nose-up attitude taken on by the aircraft at the end of landing. For aircraft having a center of gravity that is offset towards the rear of the aircraft, this behavior presents a real advantage.

In cruising flight, the pitching stabilizer means have the function of stabilizing the aircraft by creating a nose-up moment on the fuselage of the aircraft. By imposing an appropriate angle of incidence, the static stability of the aircraft can be improved.

In a variant, a landing incidence relationship requires an incidence parameter having:
a zero value below a first threshold speed of advance, e.g. about ten knots (kts);
a positive maximum value between a second threshold speed of advance and a third threshold speed of advance, the second threshold speed of advance being greater than the first threshold speed of advance, e.g. being about twenty knots, the third threshold speed of advance being greater than the second threshold speed of advance, e.g. about forty knots, said incidence parameter having a value that increases between said first threshold speed of advance and said second threshold speed of advance; and
a negative minimum value beyond a fourth threshold speed of advance, the fourth threshold speed of advance being greater than the third threshold speed of advance, e.g. about seventy knots, said incidence parameter having a value that decreases between the third threshold speed of advance and the fourth threshold speed of advance.

By way of example, a takeoff incidence relationship requires an incidence parameter having:
a zero value below a first limit speed of advance, e.g. about fifty knots (kts); and
a negative minimum value beyond a second limit speed of advance, the second limit speed of advance being greater than the first limit speed of advance, e.g. about seventy knots (kts), said incidence parameter having a value that decreases between the first limit speed of advance and the second limit speed of advance.

Furthermore, and by way of example, at least one incidence relationship is modulated by a modulation parameter.

An incidence relationship may be modulated in order to take account of particular features of the aircraft that may be observed during the preliminary stage.

For example, at low speed, the setpoint value of the incidence parameter may be adjusted in order to obtain pitching stabilizer means providing more or less lift depending on the compromise that is desired between the pitching attitude of the aircraft and the power that is consumed by the power plant.

Although the zero angle of incidence of the pitching stabilizer means does indeed minimize power consumption and put the aircraft into an attitude that is level in comparison with a conventional aircraft having a fixed stabilizer, a positive angle of incidence may be imposed in order to further reduce the pitching attitude of the aircraft. Nevertheless, this reduction is obtained to the detriment of power consumption.

When cruising, the setpoint value of the incidence parameter may be adjusted as a function of the moment exerted on the mast of a rotor, for example.

In the event of a failure of an engine in the power plant, it is also possible to manage angle of incidence in special manner.

If the aircraft is in autorotation, appropriate management of the setpoint value for the incidence parameter may be provided by imposing a positive angle of incidence in order to generate a nose-down moment on the aircraft.

Furthermore, protection may be provided in order to put a bound on the setpoint angle given by the control relationship during the operational stage. This characteristic is used for safety reasons to limit the range over which the pitching stabilizer means can be used.

Thus, during the operational stage, the setpoint angle is bounded by at least one bound, said bound being:
either an upper bound, the setpoint angle being maintained at the value of the upper bound when the setpoint angle delivered by the control relationship is greater than or equal to said upper bound;
or else a lower bound, the setpoint angle being maintained at the value of the lower bound when the setpoint angle delivered by the control relationship is less than or equal to said lower bound.

In addition to a method, the invention provides a system for stabilizing an aircraft having pitching stabilizer means, the pitching stabilizer means comprising at least one airfoil surface that is movable in pivoting, the stabilizer system comprising a positioner system for adjusting a deflection angle of the airfoil surface, the positioner system comprising at least one actuator connected to the airfoil surface.

Under such circumstances, the positioner system includes a processor unit acting during the operational stage to perform the method as described above, the positioner system including a measurement system for acting, during an operational step to determine, each flight value of each flight parameter in use and a determination system for determining said setpoint value, said measurement system being connected to the processor unit.

The processor unit may comprise a logic circuit. Alternatively, the processor unit may comprise a processor or the equivalent associated with a memory. The data transmitted by the measurement system and the determination system is stored in the memory. Under such circumstances, the processor executes instructions stored in the memory to make use of the data and to generate a setpoint angle that is to be reached. The processor unit then transmits a control order to the actuator in order to place the pitching stabilizer means in the required position.

The measurement system may comprise conventional equipment for an aircraft. For example, the measurement system may comprise at least one of the following pieces of equipment:

an angle sensor for measuring a longitudinal position parameter representing a position of a longitudinal pilot control that controls a longitudinal angle between a lift vector of the aircraft and gravity in a longitudinal plane of the aircraft;

an angle sensor for measuring a lateral position parameter representing a position of a lateral pilot control controlling a lateral angle between said lift vector of the aircraft and gravity in a lateral plane of the aircraft;

an attitude heading reference system (AHRS) for measuring a pitching attitude and/or a roll attitude of the aircraft;

an air data computer (ADC) for measuring an air speed and/or a vertical speed of the aircraft; and management means, e.g. of the type known as full authority digital engine control (FADEC) for determining power consumption by a power plant of the aircraft.

The determination system may comprise a button or the equivalent that can be manipulated by a pilot to enable a pilot to set the setpoint angle, or it may be a computer optionally integrated in the processor unit and serving to set this setpoint angle automatically.

By way of example, a computer is connected to the measurement system in order to act automatically to determine a setpoint value of an incidence parameter as a function of the stage of flight.

In addition to a pitching stabilizer system, the invention also provides an aircraft including the pitching stabilizer system.

BRIEF DESCRIPTION OF THE SEVERAL VIEWS OF THE DRAWINGS

The invention and its advantages appear in greater detail from the context of the following description of examples given by way of illustration and with reference to the accompanying figures, in which:

FIG. 1 is a view of an aircraft of the invention;

FIG. 2 is a view of pitching stabilizer means;

FIGS. 3 to 5 are views explaining the deflection angle of the pitching stabilizer means;

Figure 6:
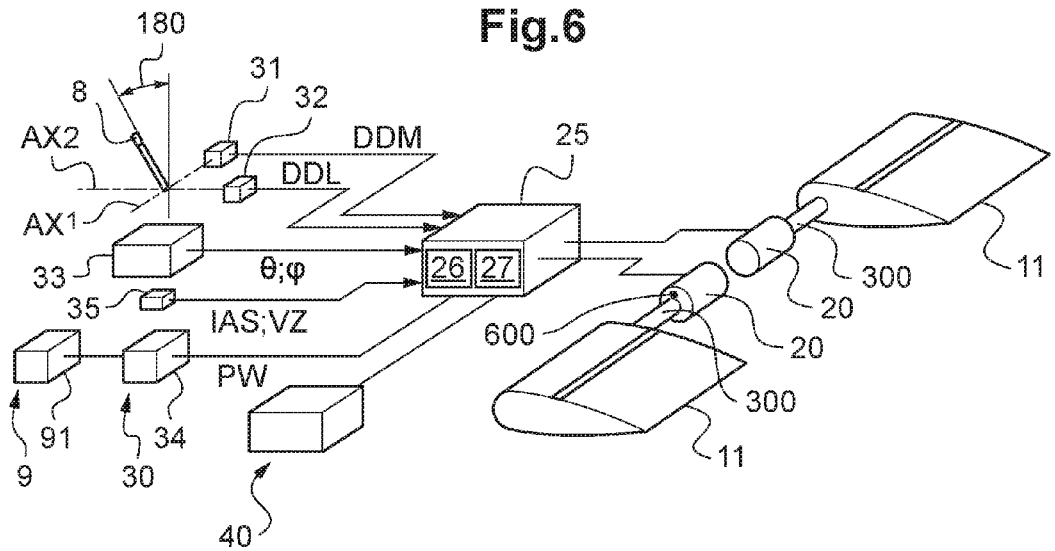
FIG. 6 is a diagram showing a pitching stabilizer system of the aircraft.

Elements present in more than one of the figures are given the same references in each of them.

DETAILED DESCRIPTION OF THE INVENTION

Three mutually orthogonal directions X, Y, and Z are shown in some of the figures.

The first direction X is said to be longitudinal. The term "longitudinal" relates to any direction that is substantially parallel to the first direction X.

The second direction Y is said to be transverse. The terms "lateral" and "transverse" relate to any direction substantially parallel to the second direction Y.

Finally, the third direction Z is said to be in elevation. The term "in elevation" relates to any direction that is substantially parallel to the third direction Z.

FIG. 1 shows an aircraft 1 having a fuselage 2. The fuselage 2 extends longitudinally from a nose to a rear end, in elevation from a bottom to a high portion carrying a rotary wing 3, and laterally from a left flank to a right flank.

By way of example, the aircraft 1 has a rotary wing 3 comprising a main rotor 4 for providing lift and possibly also propulsion. The main rotor 4 is set into rotation by a power plant 9.

Furthermore, the aircraft 1 has a pilot control 8 for controlling the pitch of the blades of the main rotor 4.

Thus, the longitudinal position of the pilot control 8 serves to control the longitudinal angle 180 longitudinally between the lift vector 190 of the aircraft 1 and gravity 191 in a longitudinal plane P1.

Likewise, the lateral position of the pilot control 8 serves to control a lateral angle lying laterally between the lift vector 190 of the aircraft 1 and gravity 191 in a lateral plane P2.

The pilot control 8 thus acts as a longitudinal pilot control and as a lateral pilot control.

Furthermore, the aircraft 1 has a pitching stabilizer system 5 carried by a structure 6 of the aircraft. This stabilizer assembly 5 constitutes piloting stabilizer means comprising at least one stabilizer airfoil surface extending transversely from the fuselage 2.

With reference to FIG. 2, the pitching stabilizer means 10 may comprise two stabilizer airfoil surfaces 11 extending on either side of the fuselage. Nevertheless, by way of example, the stabilizer means could comprise a stabilizer airfoil surface extending on one side only of the fuselage, or indeed a single stabilizer airfoil surface passing through the structure 6 of the aircraft.

The pitching stabilizer means 10 are movable in pivoting about a deflection axis AX. Thus, each stabilizer airfoil surface 11 is movable in pivoting about the deflection axis AX.

Furthermore, this stabilizer system 5 has a positioner system 15 for controlling the deflection angle.

Under such circumstances, the positioner system 15 serves to pivot the stabilizer airfoil surfaces 11, 12 about the deflection axis AX.

The positioner system 15 then includes at least one actuator suitable for pivoting at least one stabilizer airfoil surface. For example, the positioner system 15 has an outlet shaft 21 connected to the stabilizer means 11, i.e. to each stabilizer surface 11, 12. Furthermore, the positioner system 15 may possess first and second actuators 31 and 32 for pivoting the outlet shaft 21, and thus the stabilizer means. Each actuator then includes a movable meshing portion capable of causing the outlet shaft 21 to pivot.

The actuators may be electric motors with or without brushes, electric motors generating linear movement, hydraulic actuators, or pneumatic actuators.

With reference to FIG. 3, the positioner system 15 can use at least one actuator for positioning the pitching stabilizer means 10 at a zero angle.

Under such circumstances, a reference chord 10REF of the pitching stabilizer means 10 in this position lies in a reference plane PREF of the aircraft, such as a horizontal plane parallel to the longitudinal direction X and to the transverse direction Y. Such a reference chord represents a straight line segment running from the leading edge 10BA to the trailing edge 10BF of a reference profile.

With reference to FIG. 4, the positioner system 15 can use at least one actuator to position the pitching stabilizer means 10 at a deflection angle 100 that is negative.

By convention, the deflection angle is said to be negative when the leading edge 10BA of the reference profile is located below the reference plane PREF.

FIG. 4 also shows that the deflection angle 100 of the pitching stabilizer means 10 differs from the angle of incidence 150 of the pitching stabilizer means 10. The angle of incidence 150 represents the angle between said reference chord 10REF and the speed vector 151 of the incident wind. This angle of incidence is representative of a lift force 160 generated by the pitching stabilizer means.

With reference to FIG. 5, the positioner system 15 can use at least one actuator to position the pitching stabilizer means 10 at a deflection angle 100 that is positive. By convention, the deflection angle is said to be positive when the leading edge 10BA of the reference profile is arranged above the reference plane PREF.

Furthermore, and with reference to FIG. 6, the positioner system 15 may include one actuator 20 per stabilizer airfoil surface 11, 12.

In addition, the positioner system 15 is provided with a processor unit 25 connected to each actuator. By way of example, this processor unit may comprise a processor 26 or the equivalent and a memory 27. The processor 26 then applies instructions stored in the memory 27 in order to control the actuators and reach an appropriate deflection angle for each stabilizer airfoil surface.

Where appropriate, the processor unit may be of some other form, e.g. comprising a printed circuit.

In order to determine the appropriate deflection angle, the positioner system 15 possesses a measurement system 30 connected to the processor unit via at least one wired or wireless connection. The measurement system 30 makes it possible in flight to measure at least one value of a parameter referred to as a "flight" value 51. The parameter is said to be a "flight" parameter. Specifically, a flight parameter serves to characterize at least in part the position or the movements of the aircraft in three-dimensional space, or indeed the operation of certain members of the aircraft.

The measurement system may include conventional equipment for the aircraft.

For example, the measurement system may include a first angle sensor 31 for measuring a flight parameter of the "longitudinal position parameter DDM" type. This longitudinal position parameter DDM represents a position of the lateral pilot control 8 that controls the above-mentioned longitudinal angle 180.

The measurement system may include a second angle sensor 32 for measuring a flight parameter of the "lateral position parameter DDL" type. This lateral position parameter represents a position of the lateral pilot control that controls the above-mentioned lateral angle.

A flight parameter may also be a pitching attitude θ of the aircraft, a roll attitude ϕ of the aircraft, an indicated air speed (IAS) of the aircraft 1, or indeed a vertical speed Vz of the aircraft in the gravity direction.

Under such circumstances, the measurement system may for example comprise an attitude heading reference system (AHRS) unit 33 suitable for determining the pitching and/or roll attitude of the aircraft.

The measurement system may also include an air data computer (ADC) 35 for determining the indicated air speed IAS and/or the vertical speed Vz of the aircraft.

Finally, a flight parameter may be the power consumed by the power plant 9.

The measurement system may include management means 34 for each engine 91, such as management means known as full authority digital engine control (FADEC). The processor unit can then determine the power consumed by the power plant 9 by making use of measurements from the management means 34.

Furthermore, the positioner system 15 possesses a determination system 40 for determining a "setpoint" value 60* for an incidence parameter. This incidence parameter may be the aerodynamic angle of incidence 150 of the pitching stabilizer means or it may be the above-mentioned lift force 160, or it may be a twisting moment measured on a shaft 300 visible in FIGS. 2 and 6 and supporting the pitching stabilizer means.

The determination system may comprise a button or the equivalent suitable for being manipulated by a pilot, or indeed a computer that may optionally be incorporated in the processor unit.

For example, a computer is connected to the measurement system in order to act automatically to determine a setpoint value for an incidence parameter as a function of the stage of flight.

The determination system may be an integral portion of the processor unit.

Furthermore, the positioner system may include an instrument 600 for determining the current deflection angle of the pitching stabilizer means. For example, the instrument 600 possesses an angle sensor.

FIGS. 7 to 10 show the method performed by such an aircraft.

Figure 7:
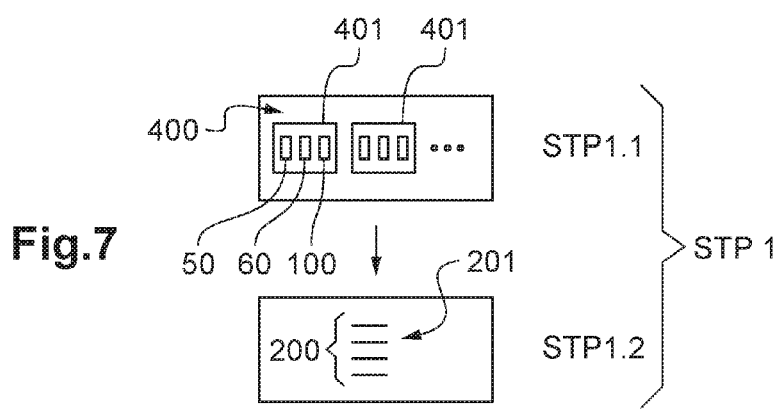
FIG. 7 is a diagram for explaining the preliminary stage of the method of the invention.

With reference to FIG. 7, a manufacturer prepares a control relationship 20 during a preliminary stage STP1.

Under such circumstances, the manufacturer acts during a measurement step STP1.1 to acquire data 400 at multiple measurement points 401 in order to prepare the control relationship. At each measurement point 401, the data 400 comprises the values of the flight parameters 50, the value of the incidence parameter 60, and the deflection angle 100 of the pitching stabilizer means 10.

This data may result from numerical stimulations, for example.

Nevertheless, in the implementation of FIG. 7, a manufacturer provides a test aircraft with instruments for this purpose. The aircraft may then include the above-described measurement system 30, and at least one instrument 600 for measuring the deflection angle of the pitching stabilizer means.

Furthermore, the aircraft is provided with a temporary system for measuring the value of an incidence parameter, such as a vane measuring an angle of incidence of the pitching stabilizer means, or strain gauges measuring a lift force.

Under such circumstances, each measurement point 401 may be obtained by way of example by positioning the pitching stabilizer means 10 at a given deflection angle and by acting in flight to measure the values of the flight parameters 50 and of the incidence parameter 60 in this position.

Using the data that is obtained, at least one control relationship 200 is prepared during a preparation step STP1.2 by conventional mathematical methods. Each control relationship 200 outputs a setpoint angle that the deflection angle of a stabilizer airfoil surface needs to reach as a function firstly of at least one flight parameter 50 of the aircraft 1, and secondly of a setpoint incidence parameter 60.

By way of example, a single control relationship 200 is drawn up for given pitching stabilizer means. Nevertheless, and by way of example, it is possible for the method to draw up a respective control relationship 200 for each stabilizer airfoil surface of the pitching stabilizer means 10.

A control relationship 200 may have multiple forms, for example it may be in the form of an algorithm having multiple lines of code 201.

By way of example, the control relationship 200 is stored in the processor unit 25, and in particular in the memory 27.

Figure 8:
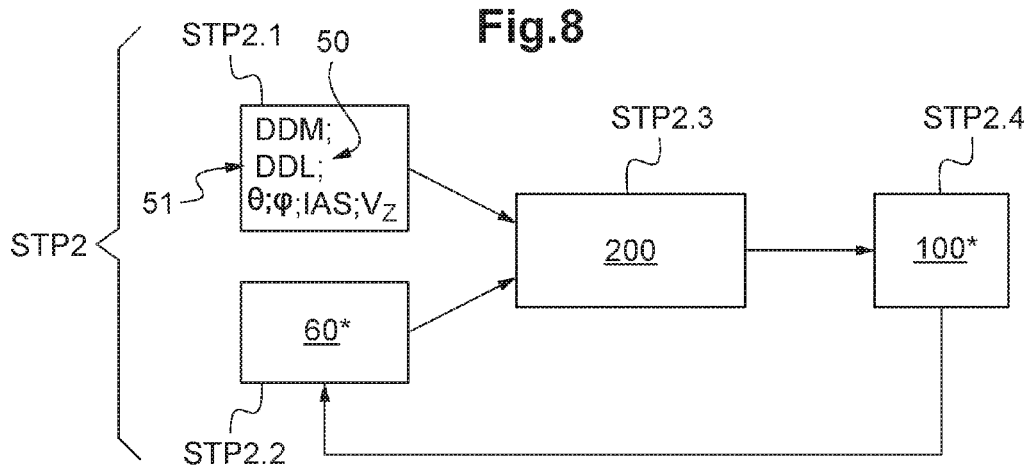
FIG. 8 is a diagram for explaining the operational stage of the method of the invention.

With reference to FIG. 8, during an operational step STP2, a manufacturer implements each control relationship as established in flight on production aircraft. The following steps are then performed in a loop.

During a step STP2.1 of acquiring flight parameters, a "flight" value 51 is determined for each of the flight parameters 50 by using the measurement system.

Furthermore, during a setpoint step STP2.2, a "setpoint" value 60* for the incidence parameter 60 is determined. The setpoint step STP2.2 is performed in parallel with the step STP2.1 of acquiring flight parameters or indeed before or after this flight parameter acquisition step STP2.1.

This setpoint value 60* represents a deflection angle to be reached by the pitching stabilizer means. The setpoint value 60* is determined up by using the determination system 40.

In a first alternative, the setpoint value 60* may thus be determined by a pilot.

In a second alternative, the setpoint value 60* is determined by using at least one incidence relationship that provides the setpoint value as a function of the stage of flight. Each incidence relationship may be modulated depending on circumstances.

Figure 9:
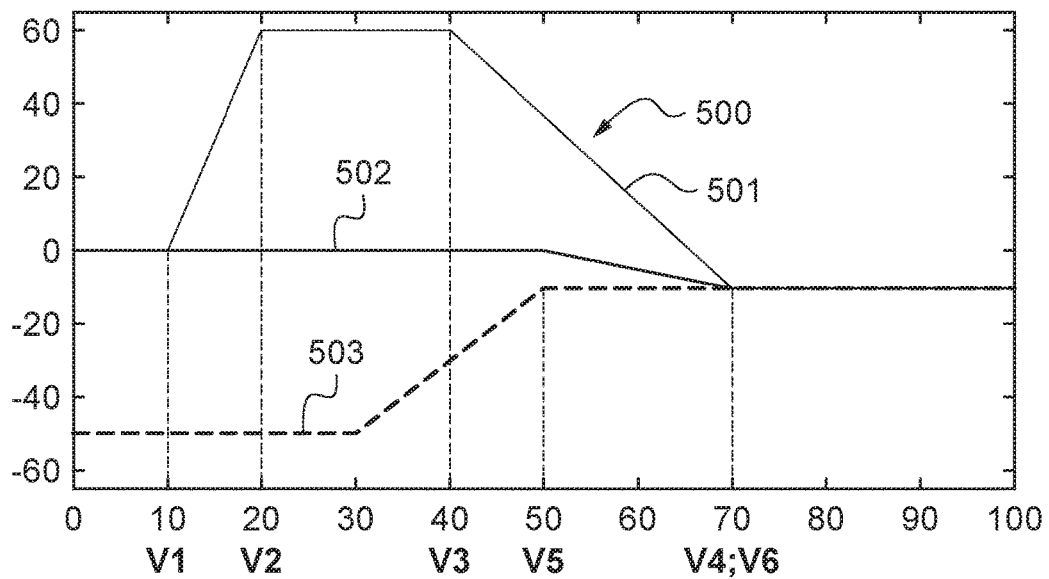
FIG. 9 is a diagram illustrating incidence relationships.

FIG. 9 shows two incidence relationships 500 on a graph plotting speed of advance of the aircraft along the abscissa axis and a value of the incidence parameter up the ordinate axis.

Thus, by way of example, the determination system may include an incidence relationship 501 for landing. In this landing incidence relationship 501, the incidence parameter has:

a zero value below a speed of advance referred to as the "first" threshold speed of advance V1;

a positive maximum value between a speed of advance referred to as the "second" threshold speed of advance V2 and a speed of advance referred to as the "third" threshold speed of advance V3;

a value that increases, e.g. linearly, between the first threshold speed of advance V1 and the second threshold speed of advance V2 from the value zero to the positive maximum value;

a negative minimum value beyond a speed of advance referred to as the "fourth" threshold speed of advance V4; and a value that decreases, e.g. linearly, between the third threshold speed of advance V3 and the fourth threshold speed of advance V4 from the positive maximum value to the negative minimum value.

When a landing stage is performed, the determination system communicates for example with the measurement system to determine the current indicated air speed, in order to deduce the setpoint value 60* therefrom.

The determination system may also store an incidence relationship for takeoff. According to this takeoff incidence relationship, the incidence parameter has:

a zero value below a speed of advance referred to as the "first" limit speed of advance V5;

a negative minimum value beyond a speed of advance referred to as the "second" limit speed of advance V6, e.g. a second limit speed of advance V6 equal to the fourth threshold speed of advance V4; and a value that decreases, e.g. linearly, between the first limit speed of advance and the second limit speed of advance from the value zero to the negative minimum value.

The landing stage and the takeoff stage may be identified either automatically as a function of flight parameters, or they may be specified by a pilot using a member that can be handled by the pilot, such as a button.

By way of example, and in order to illustrate the difference between the invention and the prior art, FIG. 9 shows a curve 503 showing the incidence of stationary stabilizer means of a prior art aircraft relative to its speed of advance.

With reference to FIG. 8, and during a step STP2.3 of issuing a control order, the processor unit 25 determines a setpoint angle 100* by inputting the flight values 51 and the setpoint value 60* into the control relationship 200.

Thereafter, the processor unit acts during an adjustment step STP2.4 to transmit a signal to at least one actuator 20 so that the deflection angle 100 of the pitching stabilizer means 10 reaches the setpoint angle 100*. At least one actuator then moves at least one airfoil surface until the current deflection angle of the airfoil surface reaches the setpoint angle.

Figure 10:
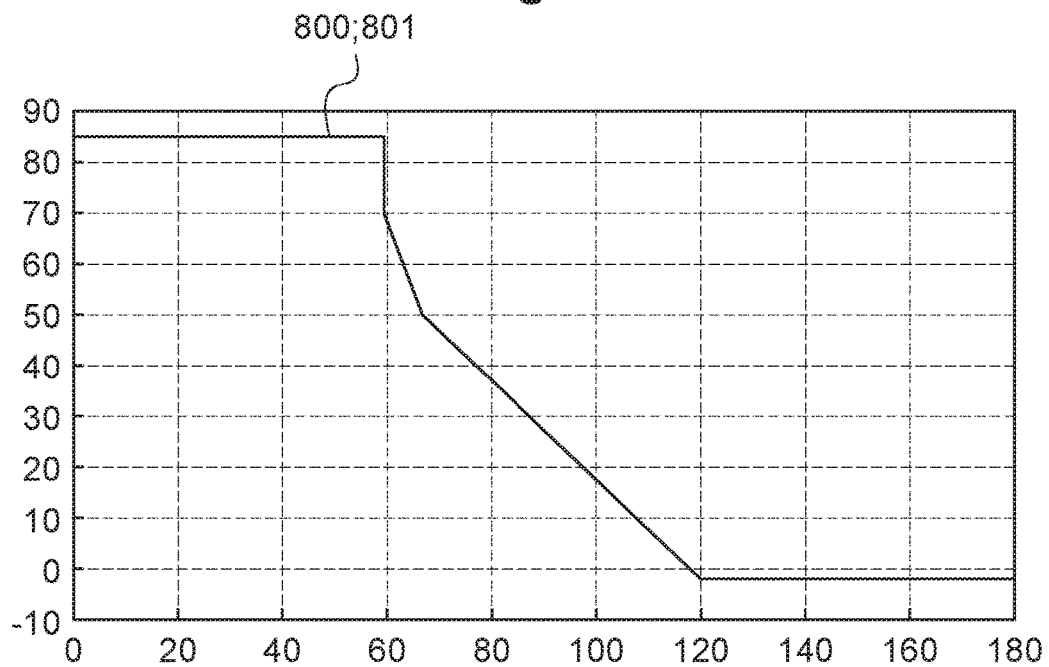
FIG. 10 is a diagram showing a bound for the setpoint angle.

Furthermore, and with reference to FIG. 10, the processor unit may, for safety purposes, put a bound on the setpoint angle 100* during the operational stage STP2. The setpoint angle 100* is then bounded by at least one bound 800 so as to avoid being greater than or less than the bound depending on the nature of the bound. Thus, a bound may be an upper bound, with the setpoint angle being maintained at the value of the upper bound whenever the setpoint angle delivered by the control relationship is greater than or equal to said upper bound. The bound may also be a lower bound 801, with the setpoint angle being maintained at the value of the lower bound when the setpoint angle provided by the control relationship is less than or equal to said lower bound.

By way of example, FIG. 10 shows an upper bound, FIG. 10 being a graph plotting the value of the upper bound up the ordinate axis and the value of a speed of advance along the abscissa axis.

Naturally, the present invention may be subjected to numerous variations as to its implementation. Although several implementations are described, it will readily be understood that it is not conceivable to identify exhaustively all positive implementations. It is naturally possible to envisage replacing any of the means described by equivalent means without going beyond the ambit of the present invention.

What is claimed is:

1. A method of controlling a deflection angle of movable pitching stabilizer means of an aircraft, wherein the method comprises:

a preliminary stage (STP1) comprising a preparation step (STP1.2) of preparing at least one control relationship providing a setpoint angle that the deflection angle is to reach as a function firstly of at least one flight parameter of the aircraft and secondly of an incidence parameter of the pitching stabilizer means, the incidence parameter being either an aerodynamic angle of incidence of the pitching stabilizer means, or a lift force exerted on the pitching stabilizer means, or a twisting moment measured on a shaft supporting the pitching stabilizer means; and an operational stage (STP2) during which the following steps are performed:
 determining a "flight" value for each of the flight parameters;
 determining a "setpoint" value for the incidence parameter;
 determining a setpoint angle by inputting the flight values and setpoint value into the control relationship; and
 activating at least one actuator to cause the deflection angle of the pitching stabilizer means to reach the setpoint angle.

2. A method according to claim 1, wherein the pitching stabilizer means comprise two stabilizer airfoil surfaces arranged laterally on either side of a structure, and a control relationship is established for each stabilizer airfoil surface, with the respective deflection angles of the two stabilizer airfoil surfaces being independent of each other.

3. A method according to claim 1, wherein each flight parameter is selected from a list comprising at least one of the following elements:
 a longitudinal position parameter (DDM) representing a position of a longitudinal pilot control controlling a longitudinal angle between a lift vector of the aircraft and gravity in a longitudinal plane of the aircraft;
 a lateral position parameter (DDL) representing a position of a lateral pilot control controlling a lateral angle between the lift vector of the aircraft and gravity in a lateral plane (P2) of the aircraft;
 a pitching attitude (θ) of the aircraft;
 a roll attitude (φ) of the aircraft;
 an air speed (IAS) of the aircraft;
 a vertical speed (Vz) of the aircraft in the gravity direction; and
 a power being consumed by a power plant of the aircraft.

4. A method according to claim 1, wherein the preliminary stage (STP1) comprises:
 a measurement step (STP1.1) during which data is acquired at measurement points associating the values of the flight parameters and the incidence parameter together with the deflection angle of the pitching stabilizer means, each measurement point being obtained by positioning the pitching stabilizer means at a given deflection angle and by measuring in flight the values of the flight parameters and of the incidence parameter; and
 the preparation step (STP1.2) during which the control relationship is set up on the basis of the data.

5. A method according to claim 1, wherein the setpoint value is set by an instrument operated by a pilot.

6. A method according to claim 1, wherein the setpoint value is determined automatically using at least one incidence relationship supplying the setpoint value as a function of a stage of flight.

7. A method according to claim 1, wherein the incidence parameter has at least one of the following values:
 a zero value during a stage of flight performed level at a speed of advance less than a threshold speed;
 a zero value during a takeoff stage with an aircraft belonging to category A; and
 a positive value below an incidence threshold during an approach stage of flight for a precision landing.

8. A method according to claim 7, wherein a landing incidence relationship requires an incidence parameter having:
 a zero value below a first threshold speed of advance (V1);
 a positive maximum value between a second threshold speed of advance (V2) and a third threshold speed of advance (V3), the second threshold speed of advance (V2) being greater than the first threshold speed of advance (V1), the third threshold speed of advance (V3) being greater than the second threshold speed of advance (V2), the incidence parameter having a value that increases between the first threshold speed of advance (V1) and the second threshold speed of advance (V2); and
 a negative minimum value beyond a fourth threshold speed of advance (V4), the fourth threshold speed of advance (V4) being greater than the third threshold speed of advance (V3), the incidence parameter having a value that decreases between the third threshold speed of advance (V3) and the fourth threshold speed of advance (V4).

9. A method according to claim 7, wherein a takeoff incidence relationship requires an incidence parameter having:
 a zero value below a first limit speed of advance; and
 a negative minimum value beyond a second limit speed of advance, the second limit speed of advance being greater than the first limit speed of advance, the incidence parameter having a value that decreases between the first limit speed of advance and the second limit speed of advance.

10. A method according to claim 7, wherein at least one incidence relationship is modulated by a modulation parameter.

11. A method according to claim 1, wherein during the operational stage (STP2), the setpoint angle is bounded by at least one bound, the bound being:
 either an upper bound, the setpoint angle begin maintained at the value of the upper bound when the setpoint angle delivered by the control relationship is greater than or equal to the upper bound;
 or else a lower bound, the setpoint angle being maintained at the value of the lower bound when the setpoint angle delivered by the control relationship is less than or equal to the lower bound.

12. A system for stabilizing an aircraft having pitching stabilizer means, the pitching stabilizer means comprising at least one airfoil surface that is movable in pivoting, the stabilizer system comprising a positioner system for adjusting a deflection angle of the airfoil surface, the positioner system comprising at least one actuator connected to the airfoil surface, wherein the positioner system includes a processor unit acting during the operational stage (STP2) to perform the method according to claim 1, the positioner system including a measurement system for determining each flight value of each flight parameter and a determination system for determining the setpoint value, the measurement system and the determination system being connected to the processor unit.

13. An aircraft, wherein the aircraft includes a pitching stabilizer system according to claim 12.

* * * * *